US011995026B2

(12) United States Patent
Nahvi et al.

(10) Patent No.: US 11,995,026 B2
(45) Date of Patent: *May 28, 2024

(54) TECHNIQUES FOR CONFIGURING ENDPOINTS WITHIN A USB EXTENSION ENVIRONMENT

(71) Applicant: Icron Technologies Corporation, Burnaby (CA)

(72) Inventors: Mohsen Nahvi, North Vancouver (CA); Robert John Daniel Butt, Surrey (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,826

(22) Filed: Nov. 29, 2022

(65) Prior Publication Data

US 2023/0111515 A1    Apr. 13, 2023

Related U.S. Application Data

(63) Continuation of application No. 17/382,024, filed on Jul. 21, 2021, now Pat. No. 11,520,728.

(60) Provisional application No. 63/055,171, filed on Jul. 22, 2020.

(51) Int. Cl.
*G06F 13/42* (2006.01)
*G06F 13/38* (2006.01)
*G06F 13/40* (2006.01)

(52) U.S. Cl.
CPC ........ *G06F 13/4282* (2013.01); *G06F 13/385* (2013.01); *G06F 13/4059* (2013.01); *G06F 2213/0042* (2013.01)

(58) Field of Classification Search
CPC ............... G06F 13/4282; G06F 13/385; G06F 13/4059; G06F 2213/0042
See application file for complete search history.

(56) References Cited

U.S. PATENT DOCUMENTS

| | | |
|---|---|---|
| 6,308,215 B1 | 10/2001 | Kolbet et al. |
| 6,381,666 B1 | 4/2002 | Kejser et al. |
| 7,149,833 B2 | 12/2006 | McLeod |
| 7,493,431 B2 | 2/2009 | McLeod |
| 7,587,536 B2 | 9/2009 | McLeod |
| 7,640,378 B2 | 12/2009 | McLeod |
| 7,818,486 B2 | 10/2010 | McLeod |

(Continued)

*Primary Examiner* — Idriss N Alrobaye
*Assistant Examiner* — Ronald T Modo
(74) *Attorney, Agent, or Firm* — Christensen O'Connor Johnson Kindness PLLC

(57) ABSTRACT

In providing USB communication functionality over a non-USB-compliant extension medium, increased latency and processing delays may be introduced, including during configuration of endpoints. In some embodiments of the present disclosure, an upstream facing port device (UFP device) and a downstream facing port device (DFP device) are used to extend USB communication across an extension medium. In some embodiments, the UFP device extracts information from packets sent between a host device and a USB device during configuration of an endpoint. In some embodiments, the UFP device sends a synthetic NRDY packet to the host device in response to a STATUS Transaction Packet to provide the UFP device and DFP device additional time to complete configuration for servicing the endpoint.

20 Claims, 8 Drawing Sheets

(56) References Cited

U.S. PATENT DOCUMENTS

| | | |
|---|---|---|
| 9,479,279 B2 | 10/2016 | Gilbert et al. |
| 2011/0022769 A1 | 1/2011 | Hung et al. |
| 2014/0181325 A1* | 6/2014 | Hundal ............... G06F 13/4045 |
| | | 710/5 |
| 2019/0102333 A1* | 4/2019 | Hundal ............... G06F 13/1673 |

* cited by examiner

TECHNIQUES FOR CONFIGURING ENDPOINTS WITHIN A USB EXTENSION ENVIRONMENT

CROSS REFERENCE TO RELATED APPLICATION APPLICATIONS

This application is a continuation of application Ser. No. 17/382,024, filed Jul. 21, 2021, which claims the benefit of Provisional Application No. 63/055,171, filed Jul. 22, 2020, the entire disclosure disclosures of which are hereby incorporated by reference herein for all purposes.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB 3 (e.g., Intel et al., Universal Serial Bus Specification, Revision 3.0, November 2008; released as Universal Serial Bus 3.1 Specification Revision 1.0 in July 2013; released as Universal Serial Bus 3.2 Specification Revision 1.0 on Sep. 22, 2017, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.1 of the USB Specifications, Super-Speed connections are provided that use a 5 Gbps (Gen 1) or 10 Gbps (Gen 2) signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, a new method and apparatus are needed to optionally allow for extension of a SuperSpeed USB device to a greater distance from the host to which it is coupled, such that SuperSpeed USB packets may be propagated between the host and the USB device.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of configuring an endpoint for communication between a host device and a USB device via a non-USB extension medium is provided. An upstream facing port device (UFP device) receives a STATUS Transaction Packet from the host device via a USB upstream facing port of the UFP device. The STATUS Transaction Packet is related to a Control Endpoint associated with the USB device. The USB device is coupled to a downstream facing port device (DFP device) communicatively coupled to the UFP device via the non-USB extension medium. The UFP device transmits a synthetic NRDY packet to the host device. The UFP device determines whether the UFP device and the DFP device have completed configuration for servicing the Control Endpoint. In response to determining that the UFP device and the DFP device have completed configuration for servicing the Control Endpoint, the UFP device transmits a synthetic ERDY packet to the host device to cause the host device to resend the STATUS Transaction Packet.

In some embodiments, an upstream facing port device (UFP device) is provided. The UFP device comprises a USB upstream facing port and an extension interface configured to be coupled to a non-USB extension medium. The UFP device further comprises logic that, in response to execution by the UFP device, causes the UFP device to perform actions for configuring an endpoint for communication between a host device coupled to the USB upstream facing port via a USB-compliant connection and a USB device coupled to a downstream facing port device (DFP device) communicatively coupled to the UFP device via the non-USB extension medium, the actions comprising: receiving, by the UFP device, a STATUS Transaction Packet from the host device via the USB upstream facing port, wherein the STATUS Transaction Packet relates to a Control Endpoint associated with the USB device; transmitting, by the UFP device, a synthetic NRDY packet to the host device; determining, by the UFP device, whether the UFP device and the DFP device have completed configuration related to the Control Endpoint; and in response to determining that the UFP device and the DFP device have completed configuration related to the Control Endpoint, transmitting, by the UFP device, a synthetic ERDY packet to the host device to cause the host device to resend the STATUS Transaction Packet.

In some embodiments, a downstream facing port device (DFP device) is provided. The DFP device comprises at least one endpoint table, a USB downstream facing port, and an extension interface configured to be coupled to a non-USB extension medium. The DFP device further includes logic that, in response to execution by the DFP device, causes the DFP device to perform actions for configuring an endpoint for communication between a USB device coupled to the USB downstream facing port via a USB-compliant connection and a host device coupled to an upstream facing port device (UFP device) communicatively coupled to the DFP device via the non-USB extension medium, the actions comprising: receiving, by the DFP device via the non-USB extension medium, information extracted by the UFP device from one or more packets relating to a Control Endpoint associated with the USB device; storing, by the DFP device, the extracted information in the at least one endpoint table; and in response to determining that the DFP device is ready to service the Control Endpoint, transmitting, by the DFP device, a notification to the UFP device that indicates that the DFP device is ready.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
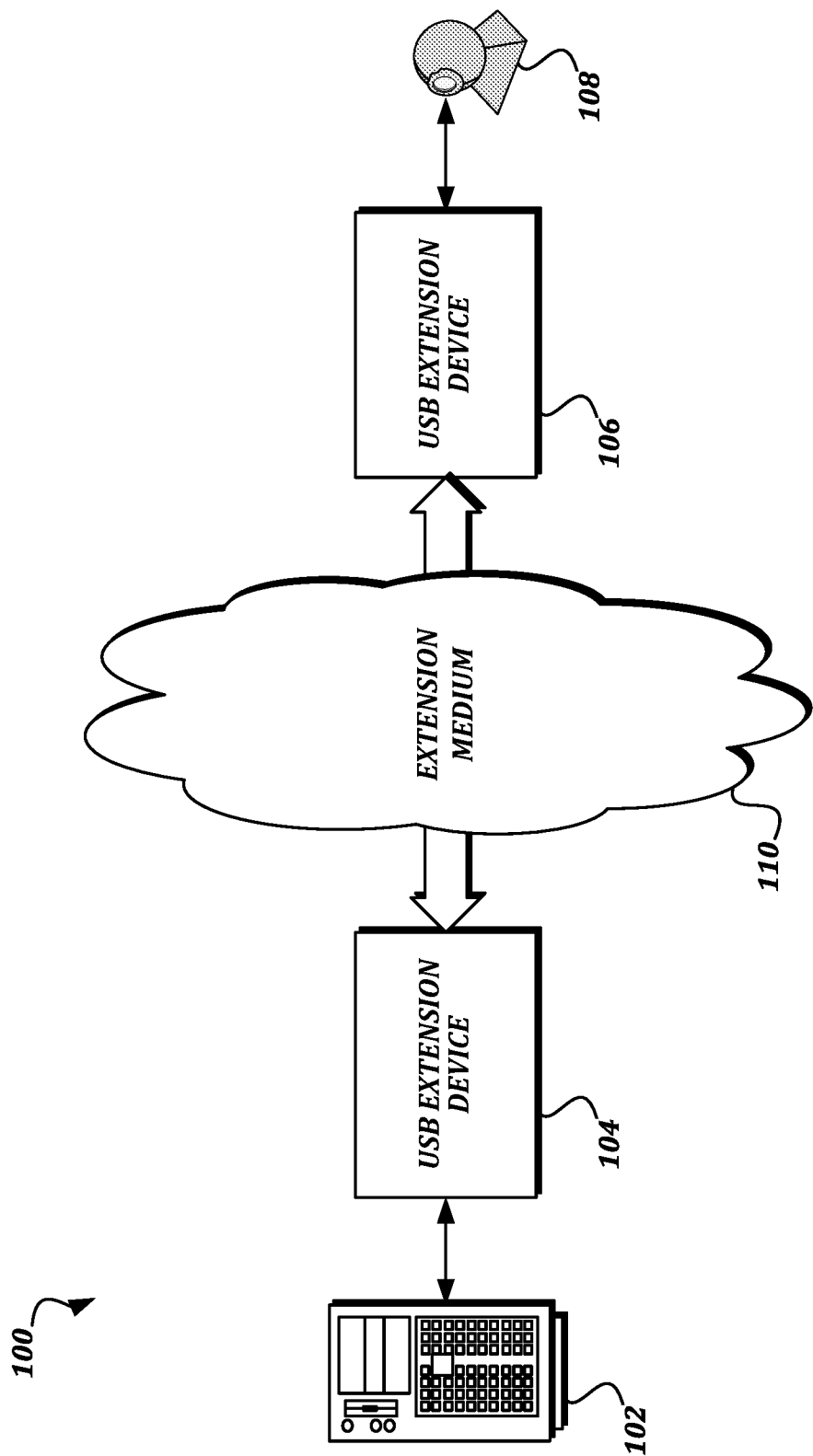
FIG. 1 is a block diagram that illustrates one embodiment of a system for extending USB communication according to various embodiments of the present disclosure.

FIG. 1 is a block diagram that illustrates one embodiment of a system 100 for extending USB communication according to various embodiments of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 3.0, USB 3.1, or USB 3.2. As discussed above, such a connection would be limited to a short distance between the host device 102 and the USB device 108 due to the timing requirements of the USB specification.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via an extension medium 110 such as a network that may increase the distance between the host device 102 and the USB device 108 beyond that supported by the USB specification. The extension medium 110 and communication thereon may include any suitable networking technology, such as Ethernet, Bluetooth, WiFi, WiMax, the Internet, fiber optic point-to-point transmission, and/or the like, and any suitable communication medium, such as via physical cables, via fiber optic cable, via wireless spectrum, and/or the like.

In some embodiments, the upstream USB extension device 104 and the downstream USB extension device 106 may happen to be closer to each other than the short USB requirement distance, and/or may be directly connected by a cable instead of via a network, but retain the capability of overcoming increased latency between the host device 102 and the USB device 108 that is introduced by the use of an extension medium 110 that does not comply with the USB specifications.

One feature provided by the upstream USB extension device 104 and downstream USB extension device 106 is that they hide the presence of the extension medium 110 from the host device 102 and the USB device 108. In other words, upstream USB extension device 104 and downstream USB extension device 106 handle communication over the extension medium 110 and compensate for any additional latency introduced thereby, but the host device 102 and the USB device 108 behave as if they were connected directly via a USB specification-compliant connection. Accordingly, the host device 102 and the USB device 108 can communicate via the upstream USB extension device 104 and downstream USB extension device 106 without any non-standard software or hardware re-configuration on the host device 102 or USB device 108.

Figure 2:
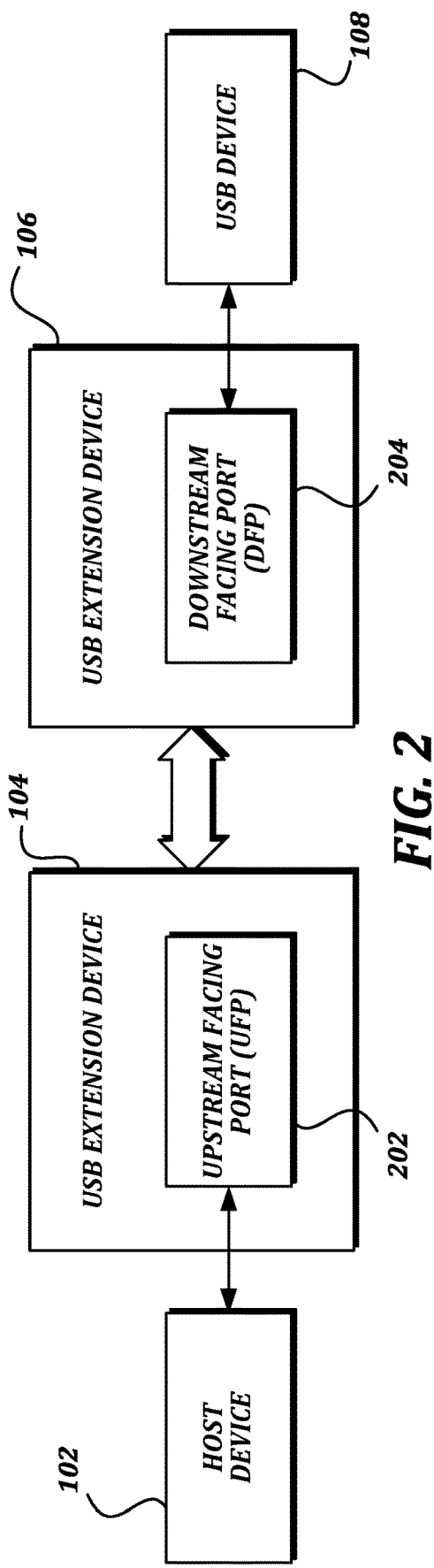
FIG. 2 is a block diagram that illustrates further details of the upstream USB extension device and downstream USB extension device illustrated in FIG. 1.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." Likewise, because the upstream USB extension device 104 includes an upstream facing port 202, the upstream USB extension device 104 may also be called a "UFP device," and because the downstream USB extension device 106 includes a downstream facing port 204, the downstream USB extension device 106 may also be called a "DFP device."

The UFP device 104 is configured at least to communicate with the host device 102 via a USB-standard-compliant protocol using the upstream facing port 202, and to exchange messages and USB bus traffic with the DFP device 106 via the extension medium 110. The DFP device 106 is configured at least to communicate with the USB device 108 via a USB-standard-compliant protocol using the downstream facing port 204, and to exchange messages and USB bus traffic with the UFP device 104 via the extension medium 110. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of the host device 102, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host device 102, such as a downstream facing port of a hub, and/or the like. Likewise, in other embodiments, the downstream facing port 204 of the downstream USB extension device 106 may be connected to an upstream facing port other than one provided by a USB device 108, such as an upstream facing port of a hub, and/or the like. The discussion below is primarily in terms of the simple topology illustrated in FIG. 2, but one of ordinary skill in the art will recognize that in some embodiments similar techniques may be used in other topologies without departing from the scope of the present disclosure.

Figure 3:
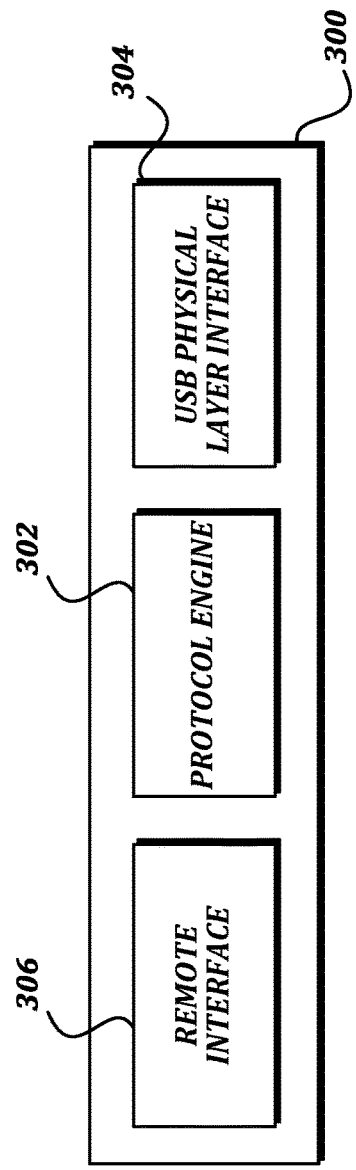
FIG. 3 is a block diagram that illustrates an exemplary embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 302, a USB physical layer interface 304, and a remote interface 306. In some embodiments, the protocol engine 302 may be configured to provide and/or execute the logic discussed below with regard to the UFP device 104 and/or the DFP device 106. The protocol engine 302 may instruct the USB physical layer interface 304 to apply the appropriate electrical signals to the USB physical layer in order to communicate with the USB device 108 or the host device 102. Likewise, the protocol engine 302 may instruct the remote interface 306 to exchange information with the remote USB extension device.

In some embodiments, the protocol engine 302 may be implemented within a logic device such as a PLD, an ASIC, a FPGA, and/or the like. In other embodiments, the protocol engine 302 may be implemented within a computing device having at least one processor and a memory containing computer-executable instructions that, if executed by the at least one processor, cause the protocol engine 302 to perform the actions discussed below; a dedicated digital hardware device implemented, for example, as a state machine configured to perform the actions described; within an application specific processor; and/or within any other suitable computing device. In some embodiments, the protocol engine 302 (or other component of the port device 300) may include a computer-readable memory usable to cache data packets, as discussed further below.

In some embodiments, logic of actions attributed to a USB extension device is executed by a protocol engine 302, which then instructs a USB physical layer interface 304 and/or a remote interface 306 to perform the appropriate communication steps associated with the logic. Throughout the discussion below, such actions may simply be described as being performed by the UFP device 104 or the DFP device 106 as if it was a single device for ease of discussion. One of ordinary skill in the art will recognize that actions attributed directly to the UFP device 104 or the DFP device 106 may actually be performed by a protocol engine 302, a USB physical layer interface 304, a remote interface 306, and/or some other component of the USB extension device.

In the system 100 illustrated and described above, the UFP device 104 and the DFP device 106 collaborate to allow the host device 102 and the USB device 108 to seamlessly communicate via USB techniques despite latency introduced by the extension medium 110. Various techniques for such collaboration may be used. For example, commonly owned U.S. Pat. No. 10,552,355, which is incorporated herein by reference in its entirety for all purposes, describes techniques for servicing isochronous IN endpoints wherein more data packets are requested from the USB device 108 by the UFP device 104 and DFP device 106 than are requested by the host device 102, and these data packets are stored by the UFP device 104 to serve subsequent requests from the host device 102.

To support this functionality (and other functionality), the UFP device 104 and DFP device 106 configure themselves to set aside resources of the UFP device 104 and DFP device 106 (such as dedicated buffer space) to service the endpoint. In a system 100 supporting a single endpoint, the configuration process may be fairly straight-forward. However, problems may occur when attempting to deconflict the setup of multiple endpoints, including multiple endpoints of different types. For example, in a system 100 supporting multiple concurrent endpoints, the UFP device 104 and DFP device 106 may store tables that record what type of communication will be conducted with each endpoint, and may preconfigure themselves to provide appropriate functionality for each endpoint. Because the UFP device 104 and DFP device 106 will take time to configure themselves, a need arises to compensate for this additional time.

Figure 4:
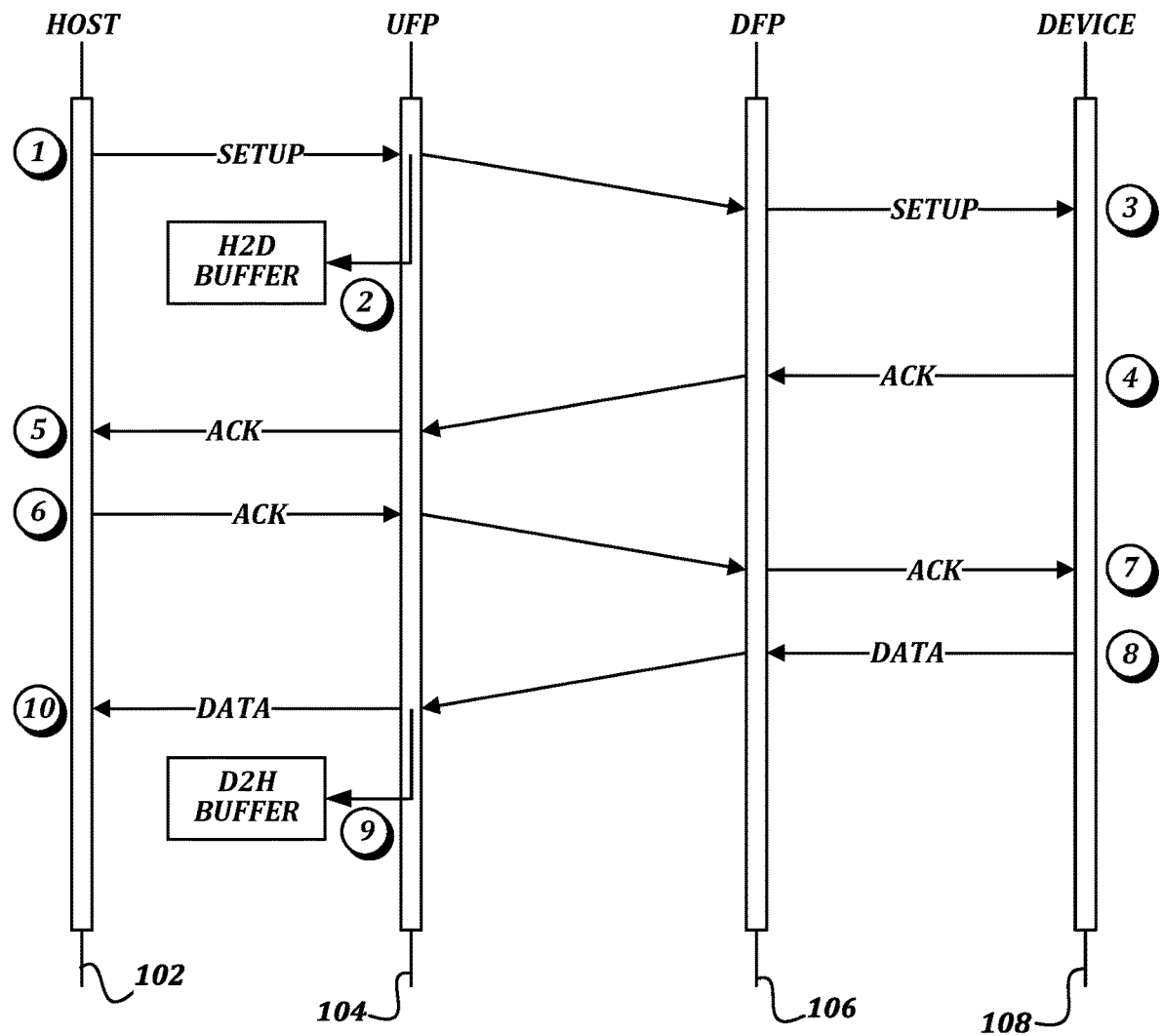
FIG. 4 and FIG. 5 are a sequence diagram that illustrates a non-limiting example embodiment of a method of processing a control transfer for configuring a USB endpoint in an extension environment according to various aspects of the present disclosure.
Figure 5:
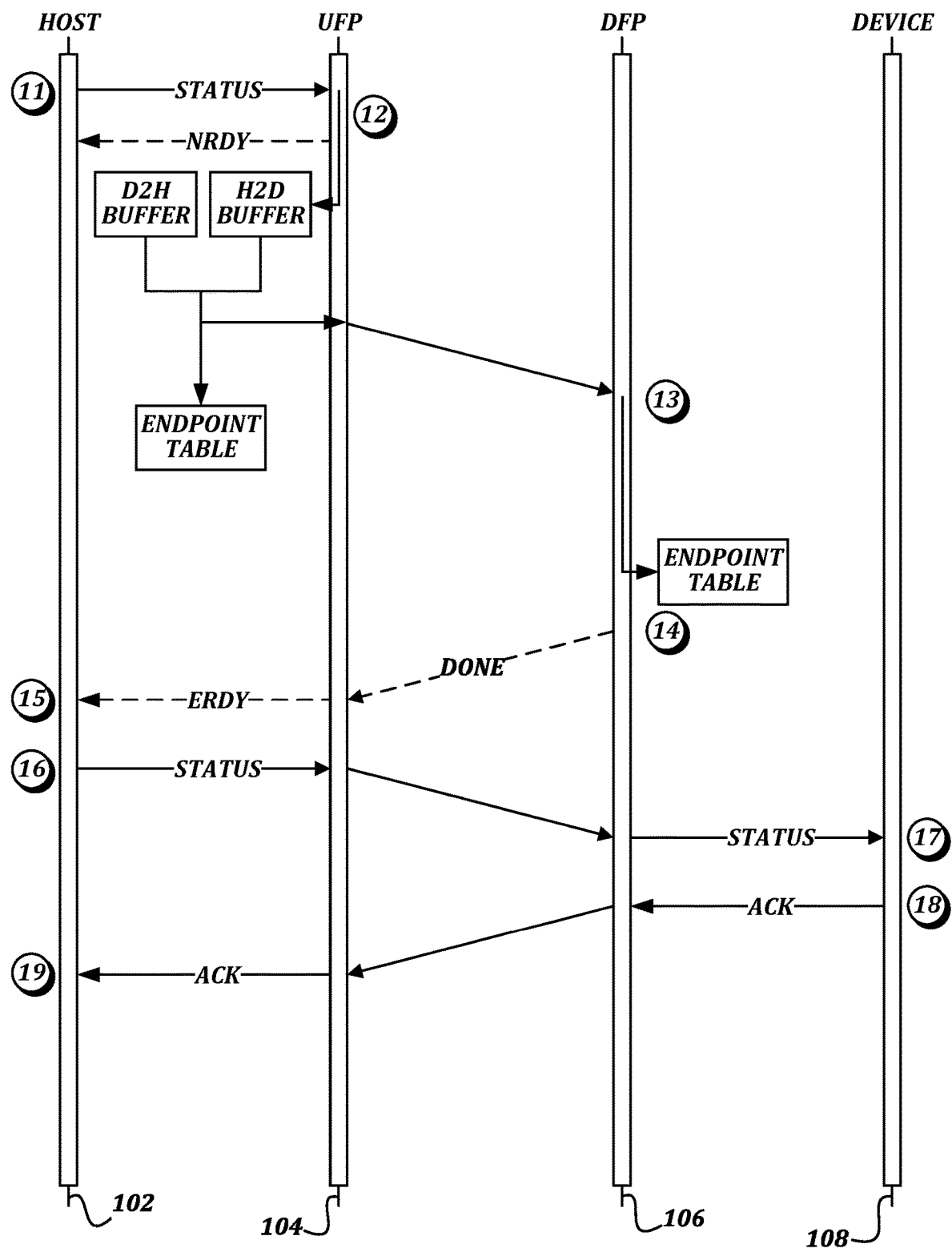

FIG. 4 and FIG. 5 are a sequence diagram that illustrates a non-limiting example embodiment of a method of processing a control transfer for configuring a USB endpoint in an extension environment according to various aspects of the present disclosure. In FIG. 4 and FIG. 5, a control transfer that includes processing of a read transaction used by the host device 102 to obtain configuration information from the USB device 108 is illustrated.

In the sequence diagram, time advances from the top to the bottom, and the top of FIG. 5 is a continuation from the bottom of FIG. 4. Arrows between the vertical segments indicate communication between the components of the system 100. The arrows between the host device 102 and UFP device 104 indicate communications transmitted via the USB physical layer interface 304 of the UFP device 104, the arrows between the UFP device 104 and DFP device 106 indicate communications transmitted via the respective remote interface 306 of the UFP device 104 and DFP device 106, and the arrows between the DFP device 106 and USB device 108 indicate communications transmitted via the USB physical layer interface 304 of the DFP device 106. The circled numbers indicate points in the sequence for discussion purposes. Further, though time advances from the top to the bottom, the timing indicated by the slopes of the arrows is not to scale and is provided for illustration purposes only (that is, the communication between the host device 102 and UFP device 104 and the communication between the DFP device 106 and USB device 108 is relatively fast and complies with timing requirements of the USB Specifications, and the communication between the UFP device 104 and DFP device 106 is relatively slow and may not or does not comply with timing requirements of the USB Specifications).

At point 1 (illustrated at the top left of FIG. 4), the host device 102 generates a setup packet addressed to a Control Endpoint and transmits the setup packet to the UFP device 104. In some embodiments, the setup packet is a SETUP DP Packet as described in Section 8.11.4 of the USB Specifications.

At point 2, the UFP device 104 processes the setup packet, and transmits the setup packet to the DFP device 106 via the extension medium 110. In some embodiments the UFP device 104 may check a type of the setup packet before processing the packet. For example, if the setup packet is a wake-up setup packet (e.g., has a deferred bit set), the UFP device 104 may simply ignore processing the setup packet and may pass it through to the DFP device 106 for transmission to the USB device 108 to wake up the USB device 108. In such cases, the method may return to point 1 when the host device 102 transmits a subsequent setup packet.

In some embodiments, the processing may include storing the setup packet so that information may later be extracted from it. In some embodiments, the UFP device 104 may determine whether the packet is relevant to configuration of an endpoint (e.g., whether the packet is addressed to endpoint 0 and is a setup, data, or status packet) before storing the packet.

In some embodiments, a single buffer may be used to store packets transmitted from the host device 102 to the USB device 108 and from the USB device 108 to the host device 102. In some embodiments, the UFP device 104 may maintain separate buffers for information sent from the host device 102 to the USB device 108 and vice versa. For example (and as illustrated), the setup packet sent from the host device 102 to the USB device 108 may be stored in a host-to-device buffer (H2D buffer). Other packets sent from the USB device 108 to the host device 102 may be stored in a device-to-host buffer (D2H buffer). The use of separate buffers to store host-to-device and device-to-host communication can help simplify the storage of these packets, particularly considering that the communication is full duplex and so one or more host-to-device packets and one or more device-to-host packets may be received concurrently and/or simultaneously. In order to reconstruct the communication between the host device 102 and the USB device 108, each packet may be stored in the H2D buffer and the D2H buffer along with a sequence number, a timestamp, and/or another indication of an order in which the packet was received.

At point 3, the USB device 108 receives the setup packet from the DFP device 106, and at point 4, the USB device 108 responds with an ACK packet per the USB Specifications. The DFP device 106 transmits the ACK packet to the UFP device 104 via the extension medium 110, and at point 5, the UFP device 104 transmits the ACK packet to the host device 102 per the USB Specifications. In some embodiments, instead of responding with an ACK packet, the USB device 108 may respond with a flow control packet. In this case, the DFP device 106 and UFP device 104 may pass the flow control packet back through to the host device 102, and may also pass through a subsequent ERDY packet from the USB device 108 before the method continues.

At point 6, the host device 102 generates an ACK packet to request information from the USB device 108, and transmits the ACK packet to the UFP device 104. The UFP device 104 transmits the ACK packet to the DFP device 106 via the extension medium 110. The DFP device 106 transmits the ACK packet to the USB device 108, which receives it at point 7. At point 8, the USB device 108 responds to the ACK packet by generating a Data Packet that includes the information requested by the host device 102, and transmitting the Data Packet to the DFP device 106. The DFP device 106 transmits the Data Packet to the UFP device 104 via the extension medium 110.

At point 9, the UFP device 104 receives the Data Packet from the DFP device 106. If the Data Packet is relevant to endpoint configuration (e.g., the UFP device 104 determines that the Data Packet is addressed to endpoint 0), the UFP device 104 stores the packet in a buffer of the UFP device 104. As shown, the UFP device 104 may store the Data Packet in a D2H buffer. At point 10, the UFP device 104 transmits the Data Packet to the host device 102.

FIG. 4 illustrates a single read transaction from point 6 to point 10. In some embodiments, the entire control transfer may include a plurality of read transactions instead of just the single read transaction illustrated in FIG. 4. In such embodiments, the actions from point 6 to point 10 would be repeated for each read transaction.

Continuing to point 11 (FIG. 5), the host device 102 attempts to initiate the status stage of a control transfer by transmitting a STATUS Transaction Packet related to the Control Endpoint. In some embodiments, the STATUS Transaction Packet may be a packet as defined in Section 8.5.4 of the USB Specifications. At point 12, the UFP device 104 receives the STATUS Transaction Packet, and responds with a synthetic NRDY packet. The NRDY packet is "synthetic" because it does not necessarily reflect the state of the USB device 108, but rather is generated by the UFP device 104 to cause the host device 102 to accommodate the timing needs introduced by the presence of the UFP device 104, the DFP device 106, and the extension medium 110.

Further, at point 12, the UFP device 104 extracts information relating to Control Endpoints from packets that have been stored in the buffers of the UFP device 104. The extracted information may include one or more of a USB Device Address value, a USB Configuration Value, a USB Interface value, a USB Endpoint Number value, a value from a bmAttributes field (such as a Transfer Type value), a BInterval value, a bMaxBurst value and a route string from the stored packets. To extract the information, the UFP device 104 may read the stored packets, and if the packets correspond to control commands including but not limited to Set Address, Get Configuration, Set Configuration, Set Interface, Clear hub port status, or Reset hub port, the UFP device 104 may parse the packet to obtain desired information. In some embodiments, the UFP device 104 may detect an active endpoint by analyzing a pair of GetConfiguration and SetConfiguration packets for the endpoint, and may use the active status as a piece of extracted information.

The UFP device 104 may then store the extracted information in an endpoint table of the UFP device 104, and also transmit the extracted information to the DFP device 106. The endpoint table lists all the active endpoints that the USB devices 108 have that are connected to the DFP device 106. In some embodiments, the UFP device 104 transmits an indication to the DFP device 106 regarding which endpoints are active, so that the DFP device 106 can update its own endpoint table to include only active endpoints. At point 13, the DFP device 106 receives the information from the buffers of the UFP device 104, and stores it in its own endpoint table.

In addition to adding the information to the respective endpoint tables, the UFP device 104 and DFP device 106 also configure themselves to be prepared to service the endpoint. For example, for isochronous IN endpoints, the UFP device 104 and/or the DFP device 106 may assign buffer space to be used to cache additional packets before they are requested by the host device 102, and may store an indication that this functionality should be used when servicing the endpoint.

Though points 12 and 13 are illustrated as occurring after point 11, it should be noted that, in some embodiments, the UFP device 104 and DFP device 106 may be working on extracting information from packets and storing information in the respective endpoint tables at any point after the packets are received instead of waiting until after the STATUS Transaction Packet is received.

Until the information being stored in the endpoint tables is complete and the UFP device 104 and DFP device 106 have completed any other configuration for servicing the endpoint, the UFP device 104 and the DFP device 106 are not yet ready to service the endpoint. Compared to the timing requirements of the USB Specifications, these actions may be slow, particularly when waiting for transmission of the information over the extension medium 110. Also, in some embodiments, the H2D buffer and D2H buffer may be implemented in hardware logic, while the endpoint table storage and other configurations are implemented in comparatively slow software logic, further increasing the amount of time the configuration takes compared to the timing requirements of the USB Specifications.

Since the UFP device 104 and DFP device 106 cannot service the endpoint until their configuration is complete, the UFP device 104 does not transmit the synthetic ERDY packet to the host device 102 (point 15) until the UFP device 104 determines whether the DFP device 106 has completed its configuration (and whether the UFP device 104 has itself completed its configuration). Once the DFP device 106 has completed its configuration, at point 14, the DFP device 106 transmits a done notification to the UFP device 104. The done notification is not defined in the USB Specifications, but notifies the UFP device 104 that the configuration on the DFP device 106 is complete.

At point 15, the UFP device 104 generates a synthetic ERDY packet and transmits the synthetic ERDY packet to the host device 102. The synthetic ERDY packet places the host device 102 in a state where it will retry initiation of the status stage of the control transfer. Accordingly, at point 16, the host device 102 transmits a new Status Transaction Packet to the UFP device 104, which receives it and transmits it to the DFP device 106. The DFP device 106 receives the Status Transaction Packet, and at point 17, transmits it to the USB device 108. At point 18, the USB device 108 responds to the Status Transaction Packet by transmitting an ACK packet to the DFP device 106. The DFP device 106 transmits the ACK packet to the UFP device 104, and at point 19, the UFP device 104 transmits the ACK packet to the host device 102.

After point 19, the status stage of the control transfer is complete, the extension environment is configured to support the endpoint, and any delay introduced by the configuration of the UFP device 104 and DFP device 106 or by the extension medium 110 has been seamlessly compensated for. At this point, the method is complete.

Figure 6:
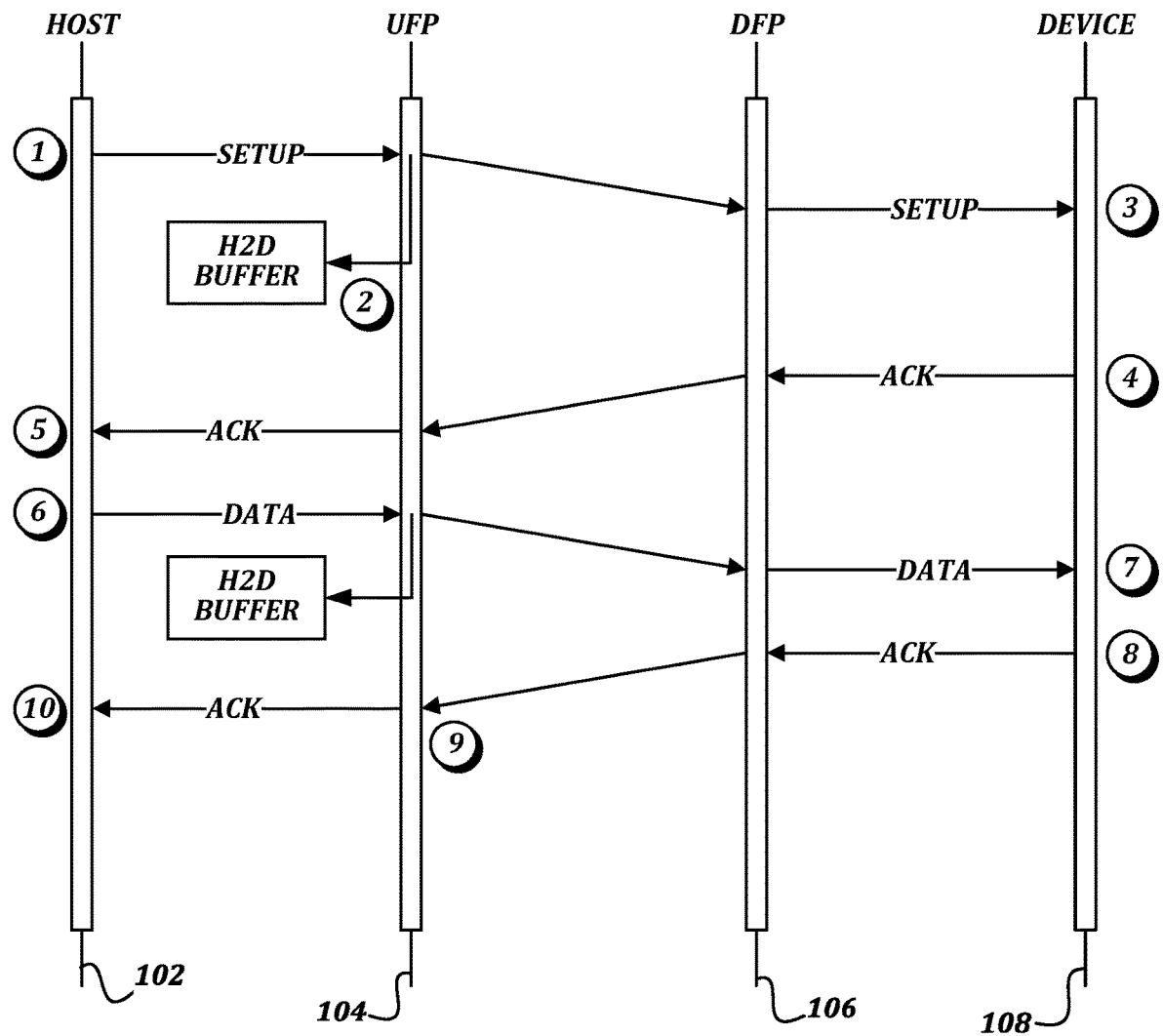
FIG. 6 and FIG. 7 are a sequence diagram that illustrates another non-limiting example embodiment of a method of processing a control transfer for configuring a USB endpoint in an extension environment according to various aspects of the present disclosure.
Figure 7:
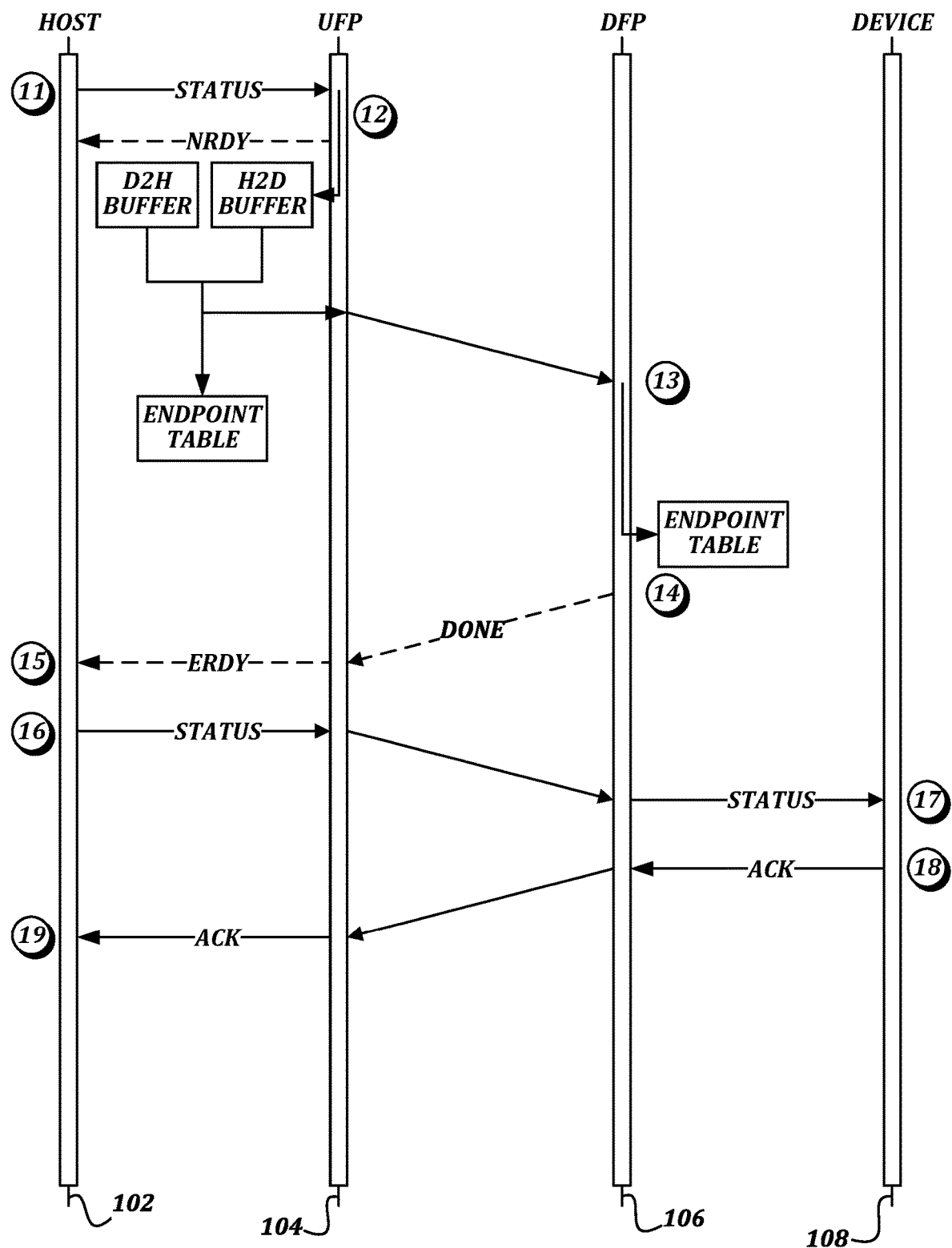

FIG. 6 and FIG. 7 are a sequence diagram that illustrates another non-limiting example embodiment of a method of processing a control transfer for configuring a USB endpoint in an extension environment according to various aspects of the present disclosure. In FIG. 6 and FIG. 7, a control transfer that includes processing of a write transaction used by the host device 102 to set a configuration on the USB device 108 is illustrated.

In the sequence diagram illustrated in FIG. 6 and FIG. 7, time advances from the top to the bottom, and the top of FIG. 7 is a continuation from the bottom of FIG. 6. Arrows between the vertical segments indicate communication between the components of the system 100. The arrows between the host device 102 and UFP device 104 indicate communications transmitted via the USB physical layer interface 304 of the UFP device 104, the arrows between the UFP device 104 and DFP device 106 indicate communications transmitted via the respective remote interface 306 of the UFP device 104 and DFP device 106, and the arrows between the DFP device 106 and USB device 108 indicate communications transmitted via the USB physical layer interface 304 of the DFP device 106. The circled numbers indicate points in the sequence for discussion purposes. Further, though time advances from the top to the bottom, the timing indicated by the slopes of the arrows is not to scale and is provided for illustration purposes only (that is, the communication between the host device 102 and UFP device 104 and the communication between the DFP device 106 and USB device 108 is relatively fast and complies with timing requirements of the USB Specifications, and the communication between the UFP device 104 and DFP device 106 is relatively slow and may not or does not comply with timing requirements of the USB Specifications).

At point 1 (illustrated at the top left of FIG. 6), the host device 102 generates a setup packet addressed to a Control Endpoint and transmits the setup packet to the UFP device 104. In some embodiments, the setup packet is a SETUP DP Packet as described in Section 8.11.4 of the USB Specifications.

At point 2, the UFP device 104 processes the setup packet, and transmits the setup packet to the DFP device 106 via the extension medium 110. In some embodiments the UFP device 104 may check a type of the setup packet before processing the packet. For example, if the setup packet is a wake-up setup packet (e.g., has a deferred bit set), the UFP device 104 may simply ignore processing the setup packet and may pass it through to the DFP device 106 for transmission to the USB device 108 to wake up the USB device 108. In such cases, the method may return to point 1 when the host device 102 transmits a subsequent setup packet.

In some embodiments, the processing performed by the UFP device 104 may include storing the setup packet so that information may later be extracted from it. In some embodiments, the UFP device 104 may determine whether the packet is relevant to configuration of an endpoint (e.g., whether the packet is addressed to endpoint 0 and is a setup, data, or status packet) before storing the packet. As described above, in some embodiments, the UFP device 104 may store all packets in a single buffer, and in some embodiments, the UFP device 104 may maintain separate buffers for information sent from the host device 102 to the USB device 108 and vice versa. As illustrated, the setup packet sent from the host device 102 to the USB device 108 may be stored in a host-to-device buffer (H2D buffer). Other packets sent from the USB device 108 to the host device 102 may be stored in a device-to-host buffer (D2H buffer). The UFP device 104 may add a sequence number, a timestamp, and/or other information to the storage location for each packet in order to allow the order in which the packets were generated and/or received to be reconstructed.

At point 3, the USB device 108 receives the setup packet from the DFP device 106, and at point 4, the USB device 108 responds with an ACK packet per the USB Specifications. The DFP device 106 transmits the ACK packet to the UFP device 104 via the extension medium 110, and at point 5, the UFP device 104 transmits the ACK packet to the host device 102 per the USB Specifications. In some embodiments, instead of responding with an ACK packet, the USB device 108 may respond with a flow control packet. In this case, the DFP device 106 and UFP device 104 may pass the flow control packet back through to the host device 102, and may also pass through a subsequent ERDY packet from the USB device 108 before the method continues.

At point 6, the host device 102 generates a Data Packet to set a configuration for the Control Endpoint on the USB device 108, and transmits the Data Packet to the UFP device 104. As with the setup packet, in some embodiments, the UFP device 104 may store the Data Packet in a buffer (such as the H2D buffer), or may ignore the Data Packet if it can be determined that the Data Packet does not include information relevant to endpoint setup.

The UFP device 104 transmits the Data Packet to the DFP device 106 via the extension medium 110. The DFP device 106 transmits the Data Packet to the USB device 108, which receives it at point 7. The USB device 108 configures its Control Endpoint based on the Data Packet according to the USB Specifications, and at point 8, the USB device 108 responds to the Data Packet by generating and transmitting an ACK packet to the DFP device 106. The DFP device 106 transmits the ACK packet to the UFP device 104 via the extension medium 110. At point 9, the UFP device 104 receives the ACK packet from the DFP device 106 and transmits it to the host device 102. At point 10, the host device 102 receives the ACK packet from the UFP device 104.

FIG. 6 illustrates a single write transaction from point 6 to point 10. In some embodiments, the entire control transfer may include a plurality of write transactions instead of just the single write transaction illustrated in FIG. 6. In such embodiments, the actions from point 6 to point 10 would be repeated for each write transaction.

Continuing to point 11 (FIG. 7), the host device 102 attempts to initiate the status stage of a control transfer by transmitting a STATUS Transaction Packet related to the Control Endpoint. In some embodiments, the STATUS Transaction Packet may be a packet as defined in Section 8.5.4 of the USB Specifications. At point 12, the UFP device 104 receives the STATUS Transaction Packet, and responds with a synthetic NRDY packet. The NRDY packet is "synthetic" because it does not necessarily reflect the state of the USB device 108, but rather is generated by the UFP device 104 to cause the host device 102 to accommodate the timing needs introduced by the presence of the UFP device 104, the DFP device 106, and the extension medium 110.

Further, at point 12, the UFP device 104 extracts information relating to Control Endpoints from packets that have been stored in the buffers of the UFP device 104. The extracted information may include one or more of a USB Device Address value, a USB Configuration Value, a USB Interface value, a USB Endpoint Number value, a value from a bmAttributes field (such as a Transfer Type value), a BInterval value, a bMaxBurst value and a route string from the stored packets. To extract the information, the UFP device 104 may read the stored packets, and if the packets correspond to control commands including but not limited to Set Address, Get Configuration, Set Configuration, Set Interface, Clear hub port status, or Reset hub port, the UFP device 104 may parse the packet to obtain desired information. In some embodiments, the UFP device 104 may detect an active endpoint by analyzing a pair of GetConfiguration and SetConfiguration packets for the endpoint, and may use the active status as a piece of extracted information.

The UFP device 104 may then store the extracted information in an endpoint table of the UFP device 104, and also transmit the extracted information to the DFP device 106. The endpoint table lists all the active endpoints that the USB devices 108 have that are connected to the DFP device 106. In some embodiments, the UFP device 104 transmits an indication to the DFP device 106 regarding which endpoints are active, so that the DFP device 106 can update its own endpoint table to include only active endpoints. At point 13, the DFP device 106 receives the information from the buffers of the UFP device 104, and stores it in its own endpoint table.

In addition to adding the information to the respective endpoint tables, the UFP device 104 and DFP device 106 also configure themselves to be prepared to service the endpoint. For example, for isochronous IN endpoints, the UFP device 104 and/or the DFP device 106 may assign buffer space to be used to cache additional packets before they are requested by the host device 102, and may store an indication that this functionality should be used when servicing the endpoint.

Though points 12 and 13 are illustrated as occurring after point 11, it should be noted that, in some embodiments, the UFP device 104 and DFP device 106 may be working on extracting information from packets and storing information in the respective endpoint tables at any point after the packets are received instead of waiting until after the STATUS Transaction Packet is received.

Until the information is stored in the endpoint tables is complete and the UFP device 104 and DFP device 106 have completed any other configuration for servicing the endpoint, the UFP device 104 and the DFP device 106 are not yet ready to service the endpoint. Compared to the timing requirements of the USB Specifications, these actions may be slow, particularly when waiting for transmission of the information over the extension medium 110. Also, in some embodiments, the H2D buffer and D2H buffer may be implemented in hardware logic, while the endpoint table storage and other configurations are implemented in comparatively slow software logic, further increasing the amount of time the configuration takes compared to the timing requirements of the USB Specifications.

Since the UFP device 104 and DFP device 106 cannot service the endpoint until their configuration is complete, the UFP device 104 does not transmit the synthetic ERDY packet to the host device 102 (point 15) until the UFP device 104 determines whether the DFP device 106 has completed its configuration (and whether the UFP device 104 has itself completed its configuration). Once the DFP device 106 has completed its configuration, at point 14, the DFP device 106 transmits a done notification to the UFP device 104. The done notification is not defined in the USB Specifications, but notifies the UFP device 104 that the configuration on the DFP device 106 is complete.

At point 15, the UFP device 104 generates a synthetic ERDY packet and transmits the synthetic ERDY packet to the host device 102. The synthetic ERDY packet places the host device 102 in a state where it will retry initiation of the status stage of the control transfer. Accordingly, at point 16, the host device 102 transmits a new Status Transaction Packet to the UFP device 104, which receives it and transmits it to the DFP device 106. The DFP device 106 receives the Status Transaction Packet, and at point 17, transmits it to the USB device 108. At point 18, the USB device 108 responds to the Status Transaction Packet by transmitting an ACK packet to the DFP device 106. The DFP device 106 transmits the ACK packet to the UFP device 104, and at point 19, the UFP device 104 transmits the ACK packet to the host device 102.

After point 19, the status stage of the control transfer is complete, the extension environment is configured to support the endpoint, and any delay introduced by the configuration of the UFP device 104 and DFP device 106 or by the extension medium 110 has been seamlessly compensated for. At this point, the method is complete.

The sequence diagrams illustrated in FIG. 4-FIG. 7 illustrate embodiments of methods that assume that the H2D buffer and/or D2H buffer are large enough and/or the information within them is processed quickly enough such that there should always be enough room within the buffers to store further information. In some embodiments, the H2D buffer and/or the D2H buffer are of a size that may be filled faster than the information within the buffers can be processed. Accordingly, in some embodiments, additional steps may be taken to ensure that the H2D buffer and/or the D2H buffer does not become over-filled.

Figure 8:
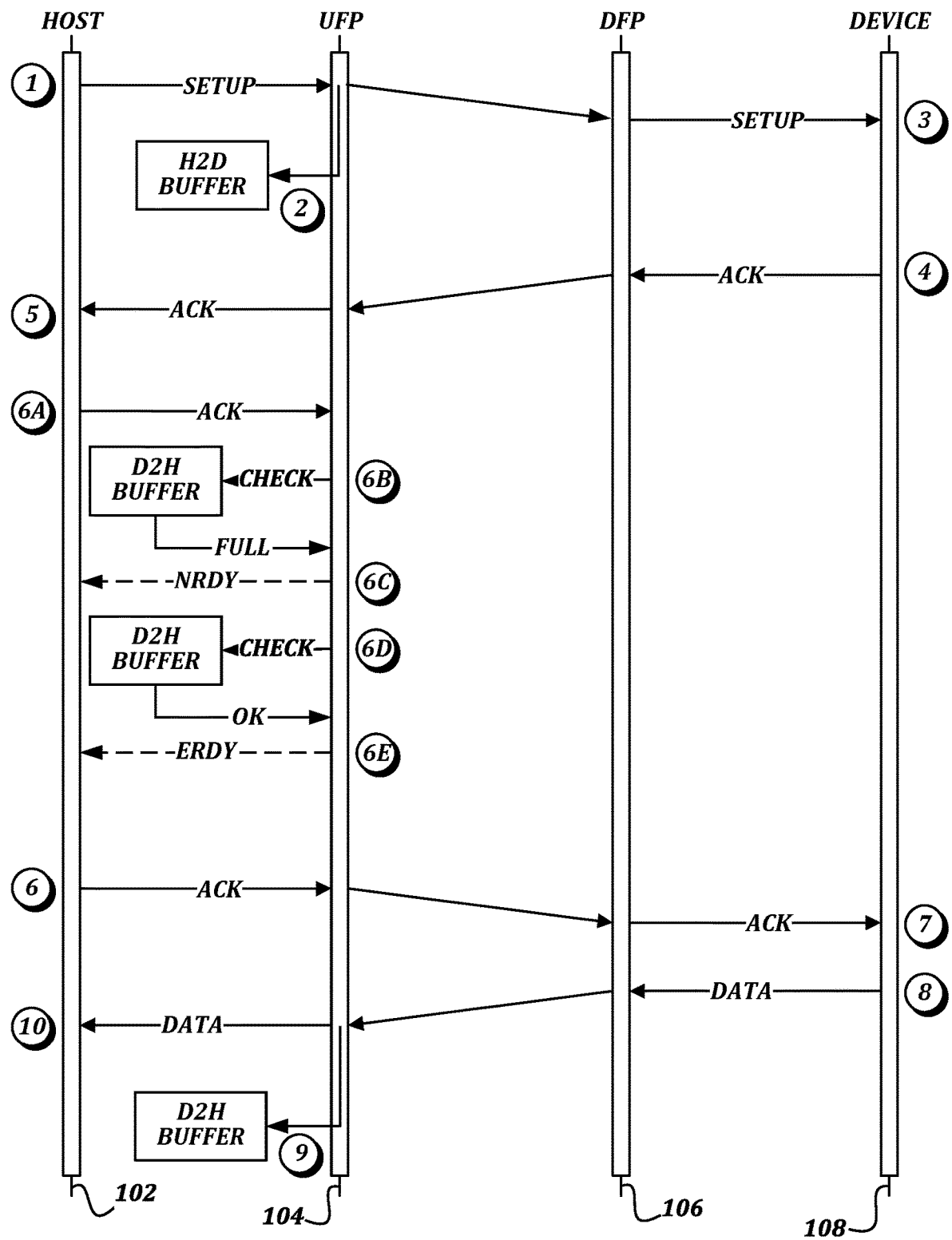
FIG. 8 is a sequence diagram that illustrates a portion of a non-limiting example embodiment of a method of processing a control transfer for configuring a USB endpoint in an extension environment according to various aspects of the present disclosure.

FIG. 8 is a sequence diagram that illustrates a portion of a non-limiting example embodiment of a method of processing a control transfer for configuring a USB endpoint in an extension environment according to various aspects of the present disclosure. The format of FIG. 8 is similar to the format of FIG. 4-FIG. 7, and so the format is not described again here for the sake of brevity.

Similar to FIG. 4 and FIG. 5, FIG. 8 illustrates a control transfer that includes processing of a read transaction used by the host device 102 to obtain configuration information from the USB device 108. From point 1 to point 5, the actions taken by the host device 102, the UFP device 104, the DFP device 106, and the USB device 108 are the same as those described from point 1 to point 5 in FIG. 4, and so are not described again here for the sake of brevity.

At point 6A, the host device 102 generates an ACK packet to request information from the USB device 108, and transmits the ACK packet to the UFP device 104. At point 6B, instead of merely transmitting the ACK packet to the USB device 108 via the DFP device 106 (as illustrated in FIG. 4), the UFP device 104 instead detects that the host device 102 is requesting information from the USB device 108 that the UFP device 104 will want to store in the D2H buffer. Accordingly, at point 6B, the UFP device 104 checks the D2H buffer to determine whether an amount of free space in the D2H buffer is greater than a predetermined threshold amount. In some embodiments, the UFP device 104 may predict a size of the information to be returned by the USB device 108 in response to the ACK packet, and the predetermined threshold amount may ensure that enough space remains in the buffer to store the information to be returned by the USB device 108. In some embodiments, the UFP device 104 may predict an amount of free space that will be available in the buffer at a time when the information will be received by the UFP device 104, taking into account a rate at which the information already in the buffer is being processed and an amount of latency in communication between the UFP device 104 and DFP device 106. The UFP device 104 may then compare this predicted amount of free space to the predetermined threshold.

In the illustrated embodiment, during the check at point 6B, the UFP device 104 determines that the amount of free space available in the D2H buffer is less than the predetermined threshold. Accordingly, at point 6C, the UFP device 104 transmits a synthetic NRDY packet to the host device 102 in order to cause the host device 102 to wait before resending the ACK packet. At point 6D, the UFP device 104 again checks the D2H buffer to determine whether enough free space is present. In some embodiments, point 6D may occur a predetermined period of time after point 6C. In some embodiments, point 6D may occur in response to the detection of events that cause the amount of free space in the D2H buffer to increase. In the illustrated embodiment, the check performed at point 6D results in an indication that the amount of free space in the D2H buffer is greater than the predetermined threshold amount. In some embodiments, multiple checks may be performed before the amount of free space in the D2H buffer is greater than the predetermined threshold.

In response to the check at point 6D indicating that enough free space is available in the D2H buffer, at point 6E, the UFP device 104 transmits a synthetic ERDY packet to the host device 102 in order to get the host to re-attempt the transmission of the ACK packet. At point 6, the host device 102 retransmits the ACK packet, and the processing continues through points 7, 8, 9, and 10 as illustrated in FIG. 4 and described above. The method may then continue through points 11-19 as illustrated in FIG. 5. These points are not illustrated or described again here for the sake of brevity.

Figure 9:
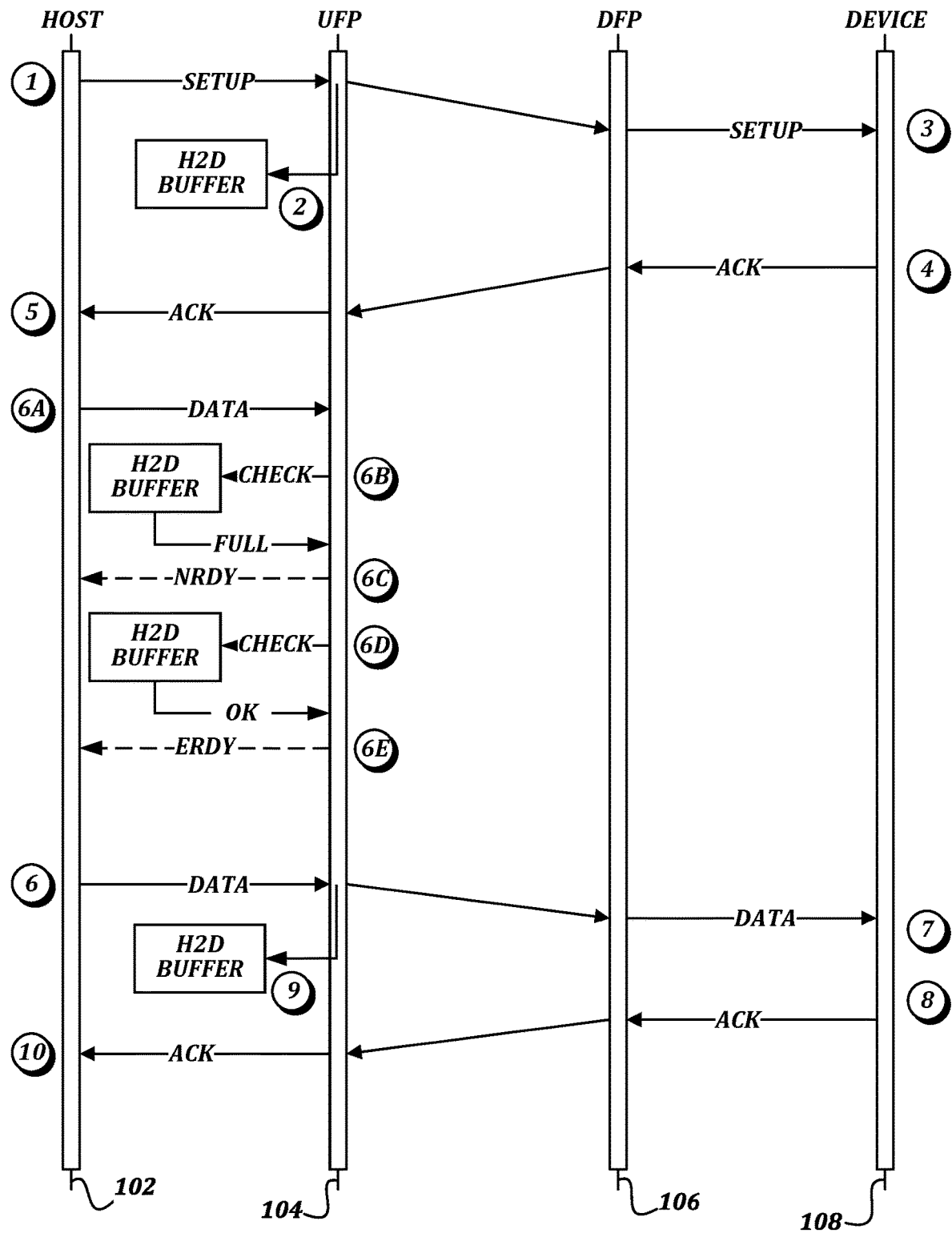
FIG. 9 is a sequence diagram that illustrates a portion of a non-limiting example embodiment of a method of processing a control transfer for configuring a USB endpoint in an extension environment according to various aspects of the present disclosure.

FIG. 9 is a sequence diagram that illustrates a portion of a non-limiting example embodiment of a method of processing a control transfer for configuring a USB endpoint in an extension environment according to various aspects of the present disclosure. The format of FIG. 9 is similar to the format of FIG. 4-FIG. 7, and so the format is not described again here for the sake of brevity.

Similar to FIG. 6 and FIG. 7, FIG. 9 illustrates a control transfer that includes processing of a write transaction used by the host device 102 to set configuration information on the USB device 108. From point 1 to point 5, the actions taken by the host device 102, the UFP device 104, the DFP device 106, and the USB device 108 are the same as those described from point 1 to point 5 in FIG. 6, and so are not described again here for the sake of brevity.

At point 6A, the host device 102 generates a DATA packet to set configuration information on the USB device 108, and transmits the DATA packet to the UFP device 104. At point 6B, instead of merely storing the DATA packet in the H2D buffer and transmitting the DATA packet to the USB device 108 via the DFP device 106 (as illustrated in FIG. 6), the UFP device 104 instead checks the H2D buffer to determine whether an amount of free space in the H2D buffer is greater than a predetermined threshold amount. In some embodiments, the UFP device 104 may compare a size of the information to be stored from the DATA packet to the free space in the H2D buffer, and the predetermined threshold amount may ensure that enough space remains in the buffer to store the information to be stored.

In the illustrated embodiment, during the check at point 6B, the UFP device 104 determines that the amount of free space available in the H2D buffer is less than the predetermined threshold. Accordingly, at point 6C, the UFP device 104 transmits a synthetic NRDY packet to the host device 102 in order to cause the host device 102 to wait before resending the DATA packet. At point 6D, the UFP device 104 again checks the H2D buffer to determine whether enough free space is present. In some embodiments, point 6D may occur a predetermined period of time after point 6C. In some embodiments, point 6D may occur in response to the detection of events that cause the amount of free space in the H2D buffer to increase. In the illustrated embodiment, the check performed at point 6D results in an indication that the amount of free space in the H2D buffer is greater than the predetermined threshold amount. In some embodiments, multiple checks may be performed before the amount of free space in the H2D buffer is greater than the predetermined threshold.

In response to the check at point 6D indicating that enough free space is available in the H2D buffer, at point 6E, the UFP device 104 transmits a synthetic ERDY packet to the host device 102 in order to get the host to re-attempt the transmission of the DATA packet. At point 6, the host device 102 retransmits the DATA packet, and the processing continues through points 7, 8, 9, and 10 as illustrated in FIG. 6 and described above. The method may then continue through points 11-19 as illustrated in FIG. 7. These points are not illustrated or described again here for the sake of brevity.

The illustrations in FIG. 4-FIG. 9 and the accompanying descriptions assume that all packets are valid and are successfully received. However, in some embodiments, the USB device 108 may reject a packet due to errors, or the host device 102 may resend a packet due to a timeout. In such cases, the UFP device 104 may detect that a duplicate packet has been sent by the host device 102 or USB device 108, and may only keep the most recent packet in its buffer(s).

The illustrations in FIG. 4-FIG. 9 also show that all extraction of information from the packets occurs at the UFP device 104. This may be beneficial in order to simplify the extension environment and reduce the need for control communication between the UFP device 104 and DFP device 106. In other embodiments, both the UFP device 104 and DFP device 106 may separately extract information from the packets. In yet other embodiments, the extraction of information from the packets may occur at the DFP device 106 instead of the UFP device 104.

While illustrative embodiments have been illustrated and described, it will be appreciated that various changes can be made therein without departing from the spirit and scope of the invention.

What is claimed is:

1. A method of configuring an endpoint for communication between a host device and a USB device via a non-USB extension medium, the method comprising:
   receiving, by an upstream facing port device (UFP device), a STATUS Transaction Packet from the host device via a USB upstream facing port of the UFP device, wherein the STATUS Transaction Packet is related to a Control Endpoint associated with the USB device, and wherein the USB device is coupled to a downstream facing port device (DFP device) communicatively coupled to the UFP device via the non-USB extension medium;
   transmitting, by the UFP device, a synthetic NRDY packet to the host device;
   determining, by the UFP device, whether the UFP device and the DFP device have completed configuration for servicing the Control Endpoint; and
   in response to determining that the UFP device and the DFP device have completed configuration for servicing the Control Endpoint, transmitting, by the UFP device, a synthetic ERDY packet to the host device to cause the host device to resend the STATUS Transaction Packet.

2. The method of claim 1, further comprising:
   receiving, by the UFP device, a packet from the host device or the DFP device; and
   storing, by the UFP device, the packet in a buffer of the UFP device.

3. The method of claim 2, wherein receiving a packet from the host device or the DFP device includes receiving, by the UFP device, a SETUP DP Packet from the host device; and
   wherein storing the packet in a buffer of the UFP device includes storing, by the UFP device, the SETUP DP Packet in a host-to-device buffer (H2D buffer) of the UFP device.

4. The method of claim 2, wherein receiving a packet from the host device or the DFP device includes receiving, by the UFP device, a Data Packet from the host device; and
   wherein storing the packet in a buffer of the UFP device includes storing, by the UFP device, the Data Packet in the H2D buffer of the UFP device.

5. The method of claim 2, further comprising:
   extracting, by the UFP device, information from one or more packets stored in at least one buffer of the UFP device; and
   storing, by the UFP device, at least a portion of the extracted information in at least one endpoint table of the UFP device;
   wherein determining whether the UFP device and the DFP device have completed configuration related to the Control Endpoint includes determining whether the UFP device has completed storing the at least a portion of the extracted information in the at least one endpoint table of the UFP device.

6. The method of claim 5, further comprising:
   transmitting, by the UFP device, at least a portion of the extracted information to the DFP device via the extension medium;
   wherein determining whether the UFP device and the DFP device have completed configuration for servicing the Control Endpoint includes determining whether the DFP device has completed processing the at least a portion of the extracted information.

7. The method of claim 5, wherein the information extracted from the one or more packets stored in the buffer of the UFP device includes at least one of a USB Device Address value, a USB Configuration Value, a USB Interface value, a USB Endpoint Number value, a Transfer Type value from bmAttributes, a BInterval value, a bMaxBurst value, and a route string.

8. The method of claim 2, wherein receiving a packet from the host device or the DFP device includes receiving, by the UFP device, a Data Packet from the DFP device via the extension medium, wherein the Data Packet was generated by the USB device in response to the SETUP DP Packet; and
   wherein storing the packet in a buffer of the UFP device includes storing, by the UFP device, the Data Packet in a device-to-host buffer (D2H buffer) of the UFP device.

9. The method of claim 8, further comprising:
   extracting, by the UFP device, information from one or more packets stored in the D2H buffer of the UFP device; and
   storing, by the UFP device, at least a portion of the information extracted from the one or more packets stored in the D2H buffer in at least one endpoint table of the UFP device.

10. The method of claim 2, wherein storing the packet in a buffer of the UFP device includes:
    storing, by the UFP device, the packet in the buffer along with a sequence number.

11. The method of claim 1, wherein determining whether the UFP device and the DFP device have completed configuration for servicing the endpoint includes determining whether the UFP device has assigned a buffer of the UFP device to be used in association with the control endpoint.

12. The method of claim 1, further comprising:
   receiving, by the UFP device, a packet from the host device;
   comparing, by the UFP device, a free space available in a buffer of the UFP device to a predetermined threshold; and
   in response to determining that the free space available in the buffer of the UFP device is below the predetermined threshold:
   transmitting, by the UFP device, a synthetic NRDY packet to the host device.

13. The method of claim 12, wherein comparing the free space available in the buffer of the UFP device to the predetermined threshold includes:
   in response to determining that the packet is an ACK packet, comparing, by the UFP device, a free space available in a D2H buffer of the UFP device to the predetermined threshold; and
   in response to determining that the packet is a DATA packet, comparing, by the UFP device, a free space available in a H2D buffer of the UFP device to the predetermined threshold.

14. The method of claim 12, further comprising:
   detecting, by the UFP device, that the free space available in the buffer of the UFP device has become greater than the predetermined threshold; and
   transmitting, by the UFP device, a synthetic ERDY packet to the host device.

15. A method of configuring an endpoint for communication between a host device and a USB device via a non-USB extension medium, the method comprising:
   receiving, by a downstream facing port device (DFP device) from an upstream facing port device (UFP device) communicatively coupled to the DFP device via the non-USB extension medium, information extracted by the UFP device from one or more packets relating to a Control Endpoint associated with the USB device;
   storing, by the DFP device, the extracted information in at least one endpoint table of the DFP device; and
   in response to determining that the DFP device is ready to service the Control Endpoint, transmitting, by the DFP device, a notification to the UFP device that indicates that the DFP device is ready.

16. The method of claim 15, further comprising:
   assigning, by the DFP device, a buffer of one or more buffers of the DFP device to be associated with the Control Endpoint;
   wherein determining that the DFP device is ready to service the Control Endpoint includes determining whether assignment of the buffer is complete.

17. The method of claim 15, wherein receiving the information extracted by the UFP device from one or more packets relating to the Control Endpoint associated with the USB device includes receiving information extracted by the UFP device from at least one SETUP DP Packet or Data Packet.

18. The method of claim 15, further comprising:
   receiving, by the DFP device via the USB downstream facing port, a Data Packet generated by the USB device;
   transmitting, by the DFP device via the non-USB extension medium, the Data Packet to the UFP device; and
   receiving, by the DFP device via the non-USB extension medium, information extracted by the UFP device from the Data Packet.

19. A system, comprising:
   an upstream facing port device (UFP device); and
   a downstream facing port device (DFP device);
   wherein the DFP device includes a USB downstream facing port and an extension interface configured to be coupled to a non-USB extension medium;
   wherein the UFP device includes an USB upstream facing port and an extension interface configured to be coupled to the non-USB extension medium;
   wherein the UFP device is communicatively coupled to the DFP device via the non-USB extension medium;
   wherein the DFP device includes at least one endpoint table; and
   wherein the DFP device includes logic that, in response to execution by the DFP device, causes the DFP device to perform actions comprising:
      receiving, by the DFP device via the non-USB extension medium, information extracted by the UFP device from one or more packets relating to a Control Endpoint associated with the USB device;
      storing, by the DFP device, the extracted information in the at least one endpoint table; and
      in response to determining that the DFP device is ready to service the Control Endpoint, transmitting, by the DFP device, a notification to the UFP device that indicates that the DFP device is ready.

20. The system of claim 19, wherein the DFP device further includes one or more buffers;
   wherein the actions performed by the DFP device further comprise assigning, by the DFP device, a buffer of the one or more buffers to be associated with the Control Endpoint; and
   wherein determining that the DFP device is ready to service the Control Endpoint includes determining whether assignment of the buffer is complete.

* * * * *